US 12,556,538 B2

(12) United States Patent
Hadash et al.

(10) Patent No.: US 12,556,538 B2
(45) Date of Patent: Feb. 17, 2026

(54) LATERAL MOVEMENT FIREWALL

(71) Applicant: MICROSOFT TECHNOLOGY LICENSING, LLC, Redmond, WA (US)

(72) Inventors: Noam Hadash, Ness Ziona (IL); Amir Kutcher, Kiryat Motzkin (IL); Edan Zwick, Tel-Aviv (IL); Philip Tsukerman, Herzliya (IL); Yair Tsarfaty, Nahariya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 18/186,862

(22) Filed: Mar. 20, 2023

(65) Prior Publication Data

US 2024/0323193 A1    Sep. 26, 2024

(51) Int. Cl.
*H04L 29/06* (2006.01)
*H04L 9/40* (2022.01)
*H04L 67/133* (2022.01)

(52) U.S. Cl.
CPC ............ *H04L 63/101* (2013.01); *H04L 63/20* (2013.01); *H04L 67/133* (2022.05)

(58) Field of Classification Search
CPC ......... H04L 63/20; H04L 63/10; H04L 63/08; H04L 63/14; H04L 63/101; H04L 63/0263
See application file for complete search history.

(56) References Cited

U.S. PATENT DOCUMENTS

| | | | | |
|---|---|---|---|---|
| 7,698,398 B1 | * | 4/2010 | Lai | ........................ G06Q 30/00 709/228 |
| 10,868,832 B2 | * | 12/2020 | Li | ....................... H04L 63/1416 |
| 2018/0278648 A1 | | 9/2018 | Li | |

FOREIGN PATENT DOCUMENTS

WO    2016176686 A1    11/2016

OTHER PUBLICATIONS

"Cortex XDR Identity Analytics", Retrieved From: https://www.paloaltonetworks.com/apps/pan/public/downloadResource?pagePath=/content/pan/en_US/resources/techbriefs/cortex-xdr-identity-analytics, Retrieved Date: Nov. 27, 2022, 3 Pages.
"Microsoft Defender For Identity Reducing Lateral Movement Path", Retrieved From: https://www.microsoft.com/videoplayer/embed/RWAOfW, Retrieved Date: Nov. 27, 2022, 1 Page.
"What Is Lateral Movement?", Retrieved From: https://web.archive.org/web/20221130114148/https://www.paloaltonetworks.com/cyberpedia/what-is-lateral-movement, Nov. 30, 2022, 7 Pages.
"Application as Filed in U.S. Appl. No. 18/112,090", filed Feb. 21, 2023, 73 Pages.

(Continued)

*Primary Examiner* — Longbit Chai
(74) *Attorney, Agent, or Firm* — Shook, Hardy & Bacon L.L.P.

(57) ABSTRACT

In one or more examples disclosed herein, a potential cyberattack is detected in a centralized computer system. A centralized policy service generates a prevention policy in response, using the information about the potential cyberattack. The prevention policy allows granular blocking of selective functionality in respect of a certain user(s). Although generated centrally, one generated, the prevention policy is distributed to multiple computer devices (e.g. within an organization) for decentralized enforcement, by policy agents executed on those computer devices.

20 Claims, 6 Drawing Sheets

(56) References Cited

OTHER PUBLICATIONS

Curwin, et al., "Understand and investigate Lateral Movement Paths (LMPs) with Microsoft Defender for Identity", Retrieved From: https://learn.microsoft.com/en-us/defender-for-identity/understand-lateral-movement-paths, Feb. 20, 2023, 7 Pages.

Duffey, Chad, "Restricting SMB-based Lateral Movement in a Windows Environment", Retrieved From: https://blog.palantir.com/restricting-smb-based-lateral-movement-in-a-windows-environment-ed033b888721, Jul. 8, 2020, 23 Pages.

Dulce, Sagie, "Burning Bridges", Retrieved From: https://i.blackhat.com/EU-21/Wednesday/EU-21-Dulce-Burning-Bridges-Stopping-Lateral-Movement-via-the-RPC-Firewall.pdf, Nov. 10, 2021, 41 Pages.

Dulce, Sagie, "Burning Bridges—Stopping Lateral Movement via the RPC Firewall", Retrieved From: https://www.youtube.com/watch?v=hz_YPIMeBMI, Feb. 1, 2022, 2 Pages.

Dulce, Sagie, "Burning Bridges—Stopping Lateral Movement via the RPC Firewall", Retrieved From: https://www.blackhat.com/eu-21/briefings/schedule/#burning-bridges---stopping-lateral-movement-via-the-rpc-firewall-24344, Nov. 8, 2021, 2 Pages.

Engin, et al., "How to prevent lateral movement attacks using Microsoft 365 Defender", Retrieved From: https://www.microsoft.com/en-us/security/blog/2022/10/26/how-to-prevent-lateral-movement-attacks-using-microsoft-365-defender/, Oct. 26, 2022, 15 Pages.

Mccormack, Chris, "XG Firewall and Lateral Movement Protection", Retrieved From: https://news.sophos.com/en-us/2019/01/22/xg-firewall-and-lateral-movement-protection/, Jan. 22, 2019, 7 Pages.

International Search Report and Written Opinion received for PCT Application No. PCT/US2024/019615, May 27, 2024, 11 pages.

International Preliminary Report on Patentability (Chapter I) received for PCT Application No. PCT/US2024/019615, mailed on Oct. 2, 2025, 06 Pages.

* cited by examiner

LATERAL MOVEMENT FIREWALL

TECHNICAL FIELD

The present disclosure pertains to cybersecurity techniques for preventing or mitigating cyberattacks involving lateral movement, and particularly to systems, methods and computer programs for implementing the same.

BACKGROUND

In cybersecurity, lateral movement refers to a collection of methods used by cyberattacks to explore and take control of a compromised network. Having gained an initial 'foothold' in a network (for example, by gaining access to a user's login credentials), an attacker will usually attempt to solidify and expand their presence, gaining access to additional data or systems. Such activity is referred to as lateral movement. For example, an attacker who has compromised a host machine may perform network reconnaissance, and from there, attempt to compromise further hosts and escalate their privileges, typically with the aim of gaining access or control of critical components or systems. Remote access functionality, e.g. which facilitates remote procedure calls or remote access to a device's local filesystem, is one source of vulnerability. Such functionality may, for example, be exploited in a ransomware attack as a way to propagate ransomware from device-to-device throughout a network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

In one or more examples disclosed herein, a potential cyberattack is detected in a centralized computer system. A centralized policy service programmatically generates a prevention policy in response, using the information about the potential cyberattack. The prevention policy allows granular blocking of selective functionality in respect of a certain user or certain users implicated in the potential cyberattack. Although generated centrally, one generated, the prevention policy is distributed to multiple computer devices (e.g. within an organization) for decentralized enforcement locally at those devices, by policy agents executed on those computer devices.

BRIEF DESCRIPTION OF FIGURES

Illustrative embodiments will now be described, by way of example only, with reference to the following schematic figures, in which.

DETAILED DESCRIPTION

Figure 1:
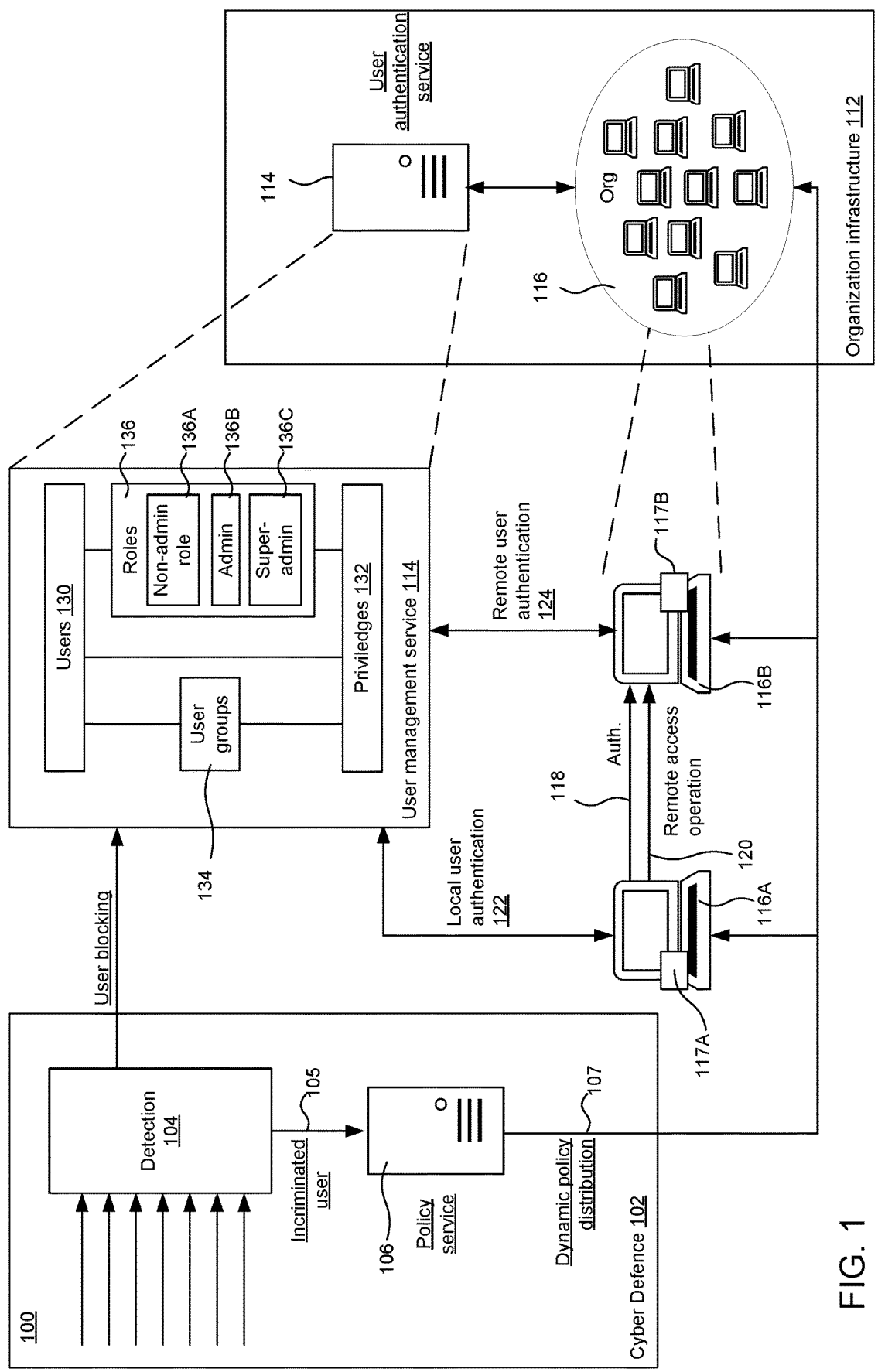
FIG. 1 shows a schematic block diagram of an example networked computer system.

FIG. 1 shows a schematic block diagram of a system 100 comprising organization infrastructure 112 supported by a cyber defence platform 102.

The organization infrastructure 112 is associated with an organization (or 'tenant'), and is shown to comprise a user management service 114, e.g., operated by a domain controller (DC), and a plurality of computer devices 116 managed by the organization. User authentication functions are provided to the computer devices 116 by the user management service 114. Typically, a user of a computer device would be validated by the user entering user credential(s) at the computer device. The user credential(s) is then transmitted to the user management service 114 for authentication, which typically involves validating the user credential(s) against a user identity recorded at the user management service 114 and determining a privilege or set of privileges associated with the user identity.

Among other things, the user management service 114 records user identities 130 (e.g. user accounts within the organization, or external accounts linked to the organization) and records privileges 132 associated with the user identities 130 within the organization. In the depicted examples, the user identifies 134 may be grouped in user groups 134 and roles 136 may also be defined and assigned to user identities or user groups. Privileges 132 can, in turn, be associated with individual user identities, particular user groups, particular roles or any combination thereof. The user management service 114 is a centralized service available to the organization's computer devices 118 for local and centralised authentication of users (referred to herein as network or domain authentication).

By way of example, the roles 136 are shown to comprise an administrator (admin) role 136B, a super-admin (or 'root user') role 136C, and a non-admin role 136A. The admin role 136B has generally elevated privileges compared with the non-admin role 136A, and the super-admin role 136C has elevated privileges compared with the admin role 136B. As will be appreciated, this is only one example, and more or fewer roles may be defined within an organization (e.g., different types of admin role and/or different types of non-admin role). References to admin accounts below include super-admin accounts, unless context demands otherwise.

Once authenticated at a computer device, a user has a level of access (e.g. to files, settings, functionality etc.) that is defined by the privileges associated with the user identity against which they have authenticated. For non-admin users in particular, the level of access is restricted.

In a remote access scenario, a first computer device 116A attempts to instigate some remote operation 120 at a second computer device 116B via a network to which the first and second computer devices 116A, 116B are connected. In that context, before allowing a remote access attempt, the second computer device 116B would require the first user device 116A to prove that the remote action is authorized. This would typically involve the first computer device 116A transmitting some authentication data 118 (such as an authentication token, credential etc.) to the second computer device 116B, which the second computer device 116B then submits to the user management service 114 for verification in a 'remote' authentication process 124 (remote in the sense that the second computer device 116B is authentication a user of the first computer device 116A who is attempting to instigate the remote operation 120).

To obtain the required authentication data, the first computer device 116A would first be required to authenticate itself with the user management service 114 against a specific user identity in the manner described above. This may be referred to as a 'local' user authentication process 122 (as a user of the first computing device 116A itself is being authenticated, albeit with a remote authentication service). Assuming the authentication is successful, the authentication data 118 would be bound to the specific user identity, and thus to the privileges associated (directly or indirectly) with that specific user identity.

One possibility is that the authentication data 118 provided by the first computer device 116A is valid but the user identity to which it is bound does not have the necessary permissions to instigate the remote operation 120. In that case, the remote operation 120 is blocked, and, therefore, not carried out at the second computer device 116B. For example, an organization might choose to restrict remote operations (or certain types of remote operations) to only admin users, in which case an attempted remote operation by a non-admin user is blocked.

Security 'posture' refers to an organizations preparedness against cyberattacks. Techniques and mechanisms may be used to improve posture, such as blocking certain remote operations (such as remote procedure call (RPC) operations or other remote protocol operations), ports, protocols, etc. In some cases, this approach can incorporate user-context, e.g. blocking such elements for certain user roles (such as non-admin roles). However, a limitation of this approach is that all choices are predetermined and statically configured, and are not correlated with any active attack on the network. Moreover, admins and super-admins may require a level of access that is, to an extent, incompatible with this approach. Therefore, a compromised admin or super-admin identity represents a particular security risk.

The cyber defence platform 102 is shown to comprise a detection service 104, which receives cybersecurity telemetry (from one or multiple sources) and uses the cybersecurity telemetry to detect signs of potential cyberattacks. Cybersecurity telemetry may, for example, be collected from multiple sources (e.g. though network monitoring, endpoint agents, cloud monitoring etc.).

One course of action open to the detection service 104 is to cause the user management service 114 to disable or restrict a user identity implicated in a possible cyberattack. For example, if it appears than an admin or super-admin account has been compromised, that account might be disabled. Once a user identity has been disabled at the user management service 114, any subsequent local authentication process (e.g., the local authentication process 122) or remote authentication process (e.g., the authentication process 124) against the disabled user identity will fail.

However, the account disabling approach has various limitations. Firstly, in the early stages of an attack, the detection service 104 may finding that an account has been compromised with only a low confidence. At this point, there is a relatively high probability that the finding is a false positive. Low-confidence detections that turn to be false positives occur relatively frequently in real-world systems, as it is often hard to distinguish the early stages of an attack from legitimate activity. Disabling an account has implications for the organization. In particular, disabling an admin account could serious hider a legitimate admin user from carrying out important or essential functions within the organization infrastructure 112. Excessive disabling of non-admin accounts can also significantly hinder productivity. Therefore, it is not feasible to simply disable an implicated account at the first sign of an attack. It is particularly important that admin accounts are not disabled unnecessarily, because of the implications for the organization, which is an issue because those accounts are represent the greatest risk if compromised.

As such, in practice, it may only be feasible to disable an implicated account once it has been implicated in a cyberattack with a sufficiently high confidence. However, the risk in this case is that the disabling action will come too late to effectively mitigate the attack. In a central user authentication model, disabling an account may have limited impact if the account is only disabled after a local authentication process or domain/network authentication process has already been completed successfully against the account. For example, in the remote access scenario of FIG. 1, if the remote authentication process 124 has already been completed against an admin user identity, simply disabling the admin user identity at the user management service 114 will not be sufficient to prevent certain remote actions (even after the user identity has been disabled, because the remote user has already an active logon session on the target endpoint/server). The same would be true if, rather than disabling the user identity altogether, certain privileges were revoked at the user management service 114. By that point, the central revocation of privileges may come too late to prevent certain remote actions from being performed even after the privileges have been revoked. In addition, by that point, the attacker might already possess a ticket or token providing him with those revoked privileges.

In summary, prevention mitigation solutions of the kind described above include dependencies on other services (such as the user management service 114) and tend to be "all or nothing", meaning a quite aggressive mitigation action such as disabling an account. Committing such an action requires a confidence level which is often achieved very late in the incident thus having little impact on the attack. As a consequence, there is a risk that ransomware actors are able spread through a network too fast for incrimination and prevention solutions, even though the activity is highly anomalous and thus readily detectable once an attack is underway.

In the following examples, a 'lateral movement firewall' (LMF) is implemented via decentralized policy distribution and policy enforcement. LMF provides for swift disruption of the lateral movement component. A prevention policy is determined centrally, but implemented in a distributed fashion across the organization's computer devices 116. The LMF is effective both in a situation where lateral movement is attempted using an account which has not been disabled or remediated in the user management service 114, and also in a situation where lateral movement is attempted using an account which has been disabled in the user management service 114, but where an attacker has already managed to obtain a valid authentication ticket or authentication token for lateral movement.

LMF is a policy-based mechanism that allows a policy enforcement agent, which is a computer program operating on a target machine, to dynamically restrict over-the-network functionalities that are being made on the target machine on behalf a user identity, based on insights (e.g. observations, alerts, detections, risk indicators etc.) generated by the detection service 104.

FIG. 1 shows the cyber defence platform 102 to additionally comprise a policy service 106. The policy service 106 receives information 105 from the detection service 104.

That information might, for example, indicate an incriminated user identity (that is, a user identity that has potentially been compromised and is potentially implicated in a cyberattack) and a level of confidence with which that user identity is implicated in a developing or ongoing cyberattack. The information 105 may include additional information, such as information about the nature of the potential attack, and a confidence that the attack is actually taking place.

The policy service 106 uses the information 105 to programmatically generate a prevention policy 107. In an embodiment, prevention policy 107 is generated dynamically, in response to the potential attack, and is tailored to the specifics of the potential attack at that point in time. In particular, the prevention policy 107 is dependent on which user or users are currently implicated in the attack, and may for example be dependent on the level of confidence with which that/those user(s) are implicated. Multiple prevention policies may be generated and to respond to the attack (or potential attack) as it develops. In another embodiment, the prevention policy 107 is generated based on one or more predetermined policies based on the specifics of the potential attack.

The prevention policy 107 is distributed to each of the computer devices 116 within the organization. The prevention policy 107 contains a list of one or more user identities and, for each user identity, a set of one or more functionalities that are being restricted for that user identity on the target machine.

A policy enforcement agent executed on each computer device receives the prevention policy 107 and implements the prevention policy 107 at that computer device. The prevention policy 107 is owned by the policy service 106. In an embodiment, policy service 106 comprises a computer program or routine that operates in a cloud computing system or a centralized computer system.

The prevention policy 107 is enforced on all of the devices 116, although success of the policy is predominantly impactful on non-compromised devices, or devices which have only been partly compromised. For completely compromised devices, 'best effort' enforcement attempts are made. In some instances, the success of protecting an already infected machine depends on the level of compromise (e.g. local system code execution, agent tampering, remote encryption only, etc.). Note, however, that the LMF mechanism remains highly effective even when a device or some devices has been fully compromised, as LMF creates a boundary between any compromised machine(s) and the rest of the organization.

By way of example, a first policy enforcement agent 117A is shown executed on the first computer device 11BA and a second policy enforcement agent 117B is shown executed on the second computer device 116B.

By allowing fine-grained control over the specific set of functionalities being denied from the user, it is possible to be more permissive with remediation actions and allow for pinpointed remediation.

As such, the local policy enforcement agent can be caused to balance the level of restrictiveness being applied on a user identity with the risk of unnecessarily disrupting a network (e.g. for something that turns out to be a false positive). This opens opportunities for the policy enforcement agent to engage during the attack's early stage, disrupting the attacker's from spreading process, and buying time for other remediation tools to engage and fully remediate the attack before the attacker had compromised massive count of machines, or had the ability to reach more valuable assets such as an organization's servers.

Once a local policy enforcement agent receives the local enforcement policy 107 from the policy service 106, it will restrict any incoming requests on behalf of compromised users. This will allow healthy/non-compromised machines to protect themselves by preventing attackers from gaining code execution on them by using compromised accounts and spreading across the organization to maximize their impact.

The LMF runs alongside the user management service 114, and is independent from it. To illustrate this independence, it is useful to consider the following example scenario.

Suppose the first computer device 116A has been compromised, and an attacker has gained access to an admin user's credential(s). The first authentication procedure 122 has completed successfully against the admin user's identity. The privileges associated with the admin identity mean that certain remote access function(s) are now available to the first computer device 116A. As such, the attacker is able to gain access to the second computer device 116B, triggering the remote authentication process 124 between the second computer device 116B and the user management service 114, which is successful because of the elevated privileges associated with the compromised admin account.

In this example scenario, the detection service 104 detects some potentially suspicious behaviours or behaviour patterns associated with the compromised admin user account, and alerts the policy server 106 (potentially with low confidence at this point in time). At this point, there may not be sufficient evidence of an attack to justify disabling the account. Therefore, the elevated privileges associated with the admin account at the user management service 14 are unaltered at this point.

However, a prevention policy 107 may be generated at this point in time, listing the compromised admin account and one or more restricted functionalities associated with it. The policy server 106 distributes the prevention policy 107 and the prevention policy 107 is received by the first and second policy enforcement agents 117A, 117B.

Focussing on the second policy enforcement agent 117B on the second computer device 116B, having received the prevention policy 107, the second policy enforcement agent 117B can take immediate steps to implement the prevention policy 107, and limit the extent to which the first computer device 116A can implement remote actions on the basis of the compromised admin account in accordance with the prevention policy 107. The prevention policy 107 is granular, in that it is able to limit a specific user identity (or identities) and specific function(s) associated with that (or each) user identity. As such, the second policy enforcement agent 117B is able to implement post-authentication mitigation based on prevention policy 107, greatly improving the responsiveness of the system 100 to developing attacks.

Note that the prevention policy 107 can override the privileges 132 maintained at the user management service 114: the privileges 132 associated with a given user identity may be sufficient to grant access to a particular functionality, but this may be overridden locally at a computer device by the policy prevention agent based on the prevention policy. The prevention policy 107 is enforced on the different endpoints locally rather than at the centralized user management service 114. Hence within the user management service 114, a user with certain privileges may be "active", but those privileges may be at least partially overridden in a decentralized manner at the endpoints via the prevention policy.

LMF is a multi-layered prevention system, allowing for both pre-authentication and post-authentication prevention at different levels within the system 100.

A detection of a cyberattack (or suspected attack) is performed centrally, and the prevention policy is also determined centrally. More comprehensive detection methods can be implemented centrally (e.g. with a larger amount of data/telemetry and/or more resource-intensive detection) compared with local detection at a given endpoint. However, once determined centrally, the prevention policy is distributed to the organization's devices 116 for decentralized enforcement across the network. In other words, the detection and creation of a prevention policy is performed centrally at the policy service 106 (e.g. in a cloud computing system or other centralized computer system) but the policy is enforced in a decentralized nature on a plurality of machines (which may comprise a combination of physical or virtual machines), hence removing a single point of failure. By removing this single point of failure, an improvement in cybersecurity is achieved compared with centralized enforcement (in centralized enforcement, a policy would be enforced centrally on the DC, leaving the organization vulnerable to attackers targeting the DC itself and reducing their impact as any attacker who already gotten DC verification will bypass their solutions). At a given second computer device, the prevention policy is implemented against remotely-instigated operations (implemented at a first computer device), which provides improved cybersecurity, as lateral movement can still be prevented or mitigated at the second computer device when the first computer device has been fully compromised.

Figure 2:
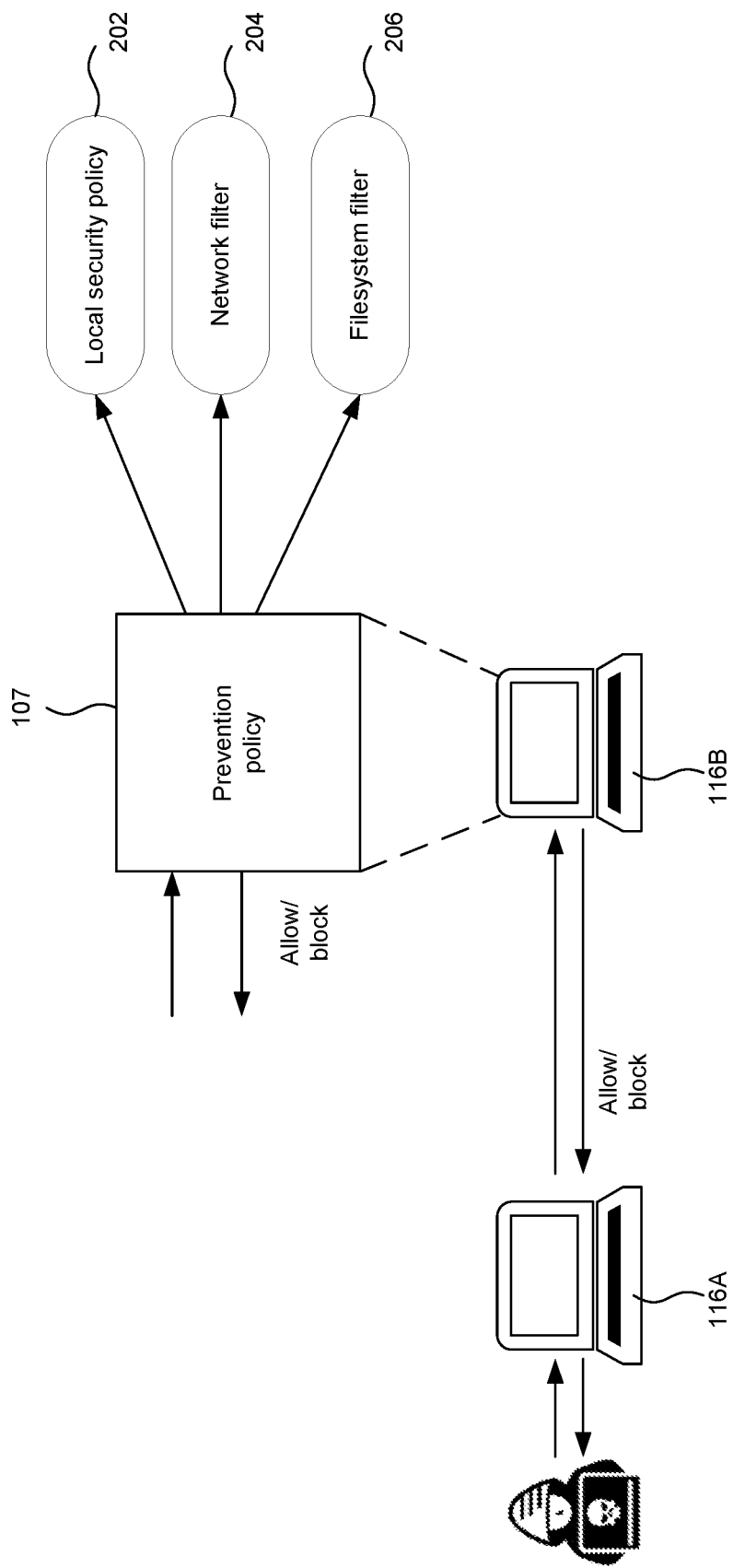
FIG. 2 shows a schematic overview of an example multi-layer prevention implemented based on a prevention policy.

FIG. 2 shows a schematic overview of one example form of multi-layer prevention implemented based on a prevention policy 107. By way of example, FIG. 2 considers the prevention policy 107 as implemented at the second computer device 116B of FIG. 1, in respect of remote actions initiated at the first computer device 116A.

In this example, the prevention policy 107 can restrict specific functionalities for specified user identities via an additional local security policy layer (e.g. implementing additional authentication/logon enforcements, above and beyond that/those managed centrally by the user management service 114), a network filtering layer 204 (e.g. to block network logon attempts, to block certain ports or bindings, and to block specified remote access actions, e.g. though packet filtering, after successful network logon and/or binding), and a filesystem filtering layer 206 (e.g. to block read and/or write actions instigated remotely for a specified remote user).

For example, the local policy enforcement agent can implement an additional logon enforcement(s), which means adding logon/authentication policies on top any logon policy defined and implemented in the centralize user management service 114. This multi-layered approach is far more flexible, allowing remediation actions to be taken at the appropriate level immediately depending on how far an attacker has progressed.

A user typically logs on remotely to a machine using an account using either a network logon, or logon interactive (e.g., RDP). As another example, the local policy enforcement agent can prevent specific types of logons (authentications), such as network logon or remote desktop protocol (RDP) logon for an incriminated user.

Examples of network logons that may be extracted include network interactive (RDP), service, or any other type of network logon.

RPC allows a remote user to execute remote functionalities on the target machine such as Remote Service Controller (PsExec), Windows Management Instrumentation (WMI), Remote Registry, Task Schedular etc. One or more of these functions may be selectively restricted as per the policy 107.

More generally, a local policy agent can block a remote access session via some remote access protocol (e.g. RPC), or (selectively) block certain remote access protocol actions within an established remote access session.

The local policy enforcement agent can block remote incriminated users from binding to an RPC interface, even after a successful network logon (RPC filtering). For example, the second local policy enforcement agent 117A may block an interface binding attempted by the first computer device 116B after a successful network logon.

As another example, the local policy enforcement agent can implement server message block (SMB) or network file sharing (NFS) Filesystem enforcement, e.g. blocking ongoing filesystem operations over SMB or NFS, to the extent defined in the prevention policy 107. The local policy enforcement agent can block filesystem related operations attempted over SMB/NFS, even after the remote user has successfully authenticated and established a SMB session remote session, and even after the remote user has already started manipulating the filesystem (for example, after the user of the first computer device 116A has begun encrypting files on the second computer device 116B).

Remote file sharing/access protocols such as SMB or NFS facilitate creating, modifying, reading files over the network to/from the target machine. Targeted restrictions on such protocols in the prevention policy 107 limit the ability of attackers to leverage such protocols in an attack.

The local policy enforcement agent 116B can also disconnect active terminal sessions (e.g. RDP sessions, or active SMB sessions, even already implemented etc.), e.g. by performing a force disconnect or logoff of remote user's terminal session (e.g. RDP) using am incriminated user identity (or identities) listed in the prevention policy 107.

As another example, the local policy enforcement agent 116B could block or terminate a WinRM connection in accordance with the prevention policy 107.

Note that not all remote actions are necessarily blocked for a user identity specified in the prevention policy 107. Upon detecting a first remotely-instigated operation associated with a given user identity, a local policy enforcement agent (e.g., the second policy enforcement agent 117B) might determine that the first remotely-instigated operation is permitted by the prevention policy (even if other type(s) of remote action are restricted for that user identity in the prevention policy 107), and allow the remotely-instigated operation in response.

Upon detecting a second remotely-instigated operation associated with the user identity, a local policy enforcement agent (e.g., the second policy enforcement agent 117B) might match the second remotely-instigated operation to the user identity and the restricted functionality in the prevention policy (implying that the second remotely-instigated is restricted for that user identity in the current prevention policy), and cause the second remotely-instigated operation to be blocked in response.

As an attack develops, a second prevention policy may be generated and distributed as more information becomes available. For example, there may be cases where pre-ransom behavior is observed that raises risk. In those cases, a first prevention policy may be generated and distributed to, say, block specific protocol (SMB) due to its increased risk associated with the behaviour, or limit connection in general to high value assets in the organization until risk is remediated. Subsequently, further indications of an attack may be detected, causing a second prevention policy with additional restrictions to be generated and distributed.

In the example of FIG. 1, the prevention policy 107 is distributed across the organization's computer devices, and is also received by the first computer device 116A. However, as can be seen, the enforcement of the prevention policy 107 against remote actions is not dependent on the policy 107 being implemented successfully at the first computer device 116A (which might have been too compromised by this point).

Figure 3:
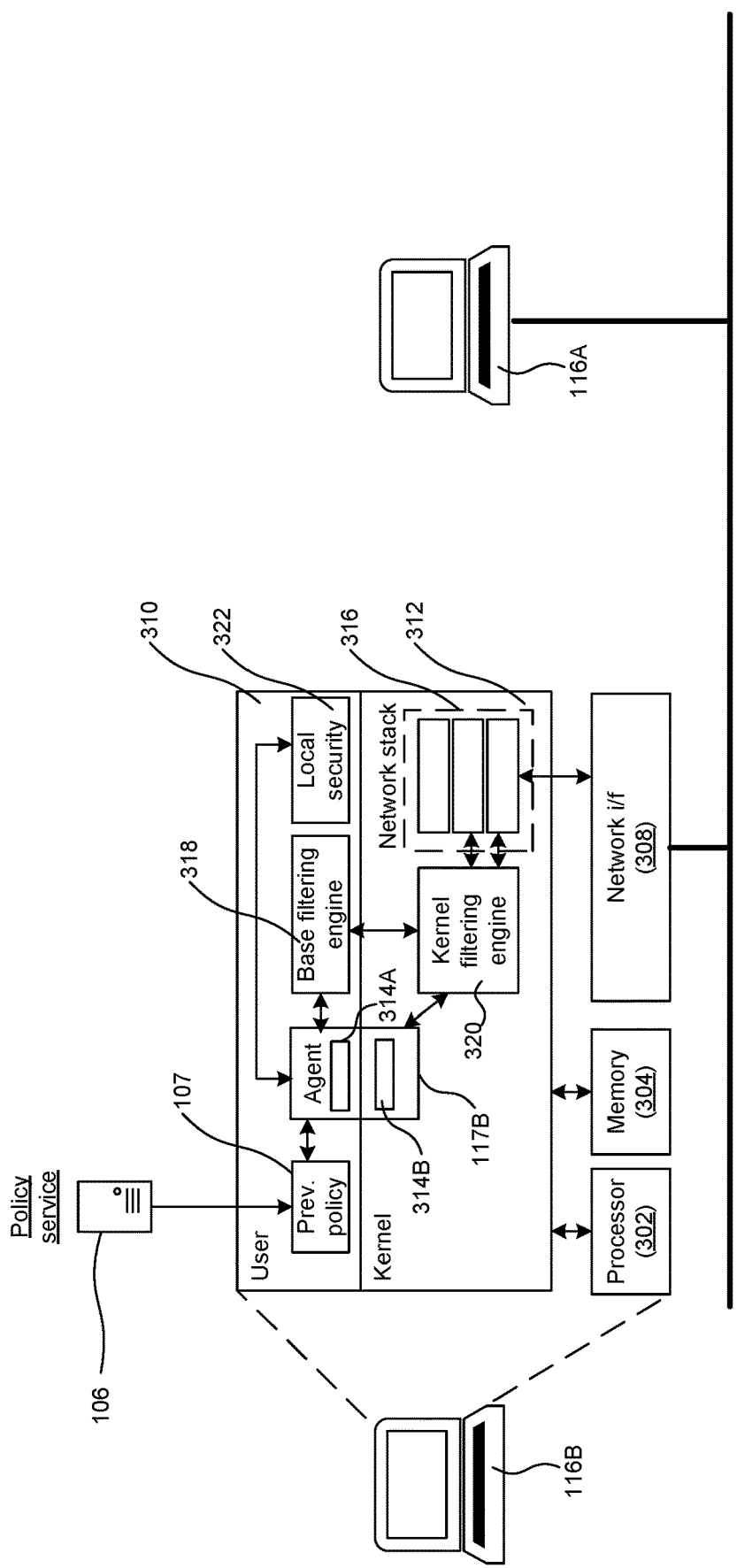
FIG. 3 shows a first example configuration of a computer device.

FIG. 3 shows a first example configuration of the second computer device 116B, which is shown to comprise a processor 302 (or processors), a memory 304 (or memories) coupled to the processor 302 and a network interface 308 coupled to the processor 302. Executable code is stored in the memory 304 for execution on the processor 302. In this example, two execution modes are implemented: a user mode 310 and a kernel mode 312. The processor 302 is capable of switching between the user mode 310 and the kernel mode 312 for different portions of code depending on the type of code to be executed, which is managed by an operating system (OS) (not shown).

In the example of FIG. 3A, the policy enforcement agent 117B is shown to comprise at least one user mode component 314A (which runs in the user mode 310) and at least one kernel mode component 314B (which runs in the kernel mode 312).

A first example function of the policy enforcement agent 117B is to implement selective network packet filtering at the second computer device 116B in accordance with the prevention policy 107. A network stack 316 is shown in the kernel mode 316, with a base filtering engine 318 running in the user mode 310 and a kernel filtering engine 320 running in the kernel mode 312. The base and kernel filtering engines 318, 320 each has a packeting filtering capability, meaning that each can operate to selectively filter (e.g. block or modify) incoming and or/outgoing network packets passing through the network stack 316. The policy enforcement agent 116B interfaces with one or both of the base filtering engine 318 and the kernel filtering engine 320 to cause packets to selectively filtered in accordance with the prevention policy. One particular use case is to filter an incoming network packet pertaining to a restricted RPC operation (e.g. logon, binding etc.) or a restricted SMB operation attempted by a remote user (e.g. a user of the first computer device 116A). In this example, the restricted RPC or SMB operation is associated with an identity of the remote user in the prevention policy, causing the policy enforcement agent 117B to e.g., block the incoming packet.

A second example function of the policy enforcement agent 117B (in addition to or as an alternative to the first example function) is enforcement of the prevention policy 107 via interaction with a local security service 322 (or services), e.g. e.g. implementing additional authentication/logon enforcements, above and beyond that/those managed centrally by the user management service 114 of FIG. 1. For example, when a user with a particular identity attempts to authenticate with the second computer device 116B (locally or remotely) in a way that violates the prevention policy 107, the policy enforcement agent 117B causes the local security service 322 to refuse authentication. As another example, if a user has already successfully authenticated, and restriction (s) are subsequently placed on that user in the prevention policy 107, the policy enforcement agent 117B may cause to the local security service 322 to forcibly logout the user.

Figure 4:
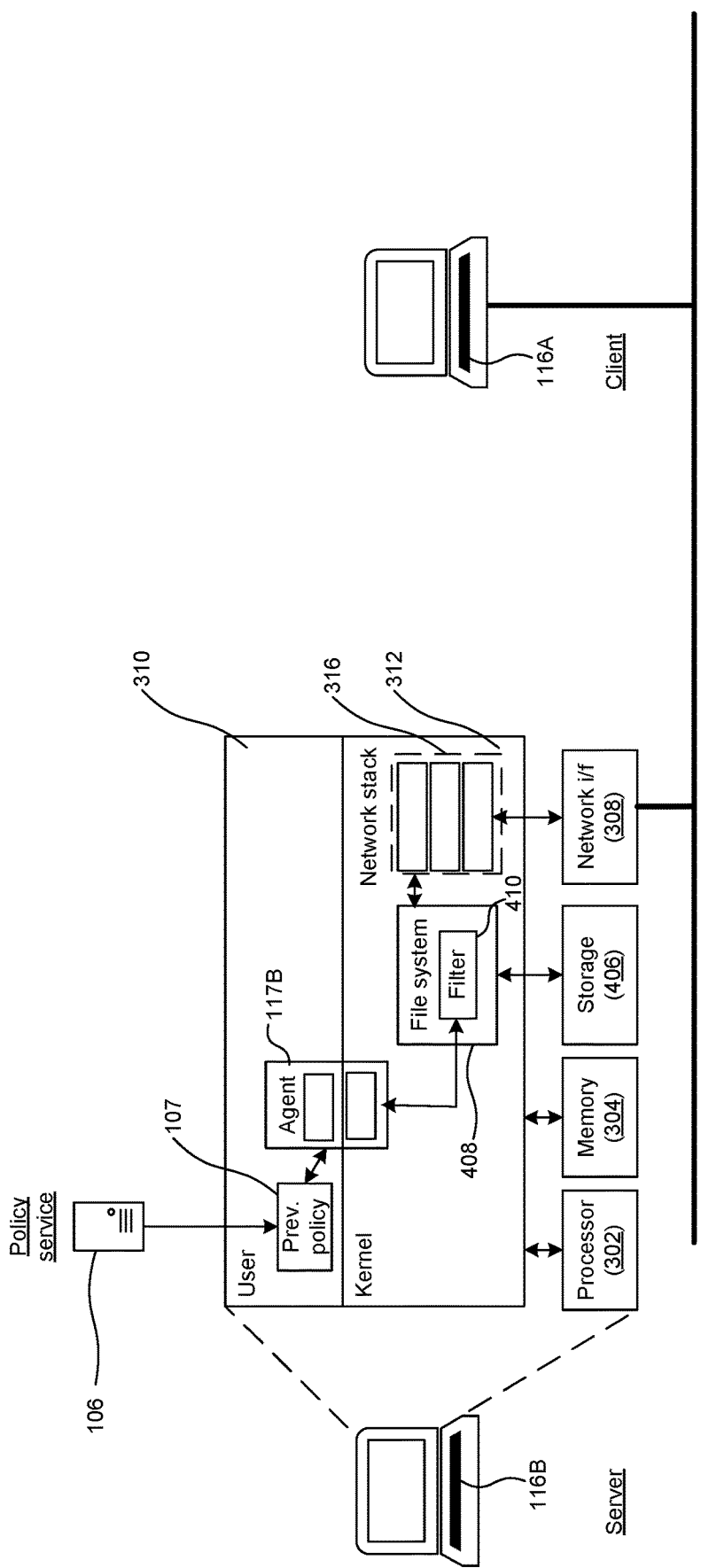
FIG. 4 shows a second example configuration of a computer device.

FIG. 4 shows a second example configuration of the second computer device 116B, which, in addition to the components of FIG. 3, is shown to comprise a storage device 406 (or devices) and a filesystem 408. The filesystem 408 runs in the kernel mode and facilitates access to data that is stored (as files) in the storage device 406. Within the filesystem 408, a filter 410 is implemented.

A third example function of the policy enforcement agent 117B (in addition to or as an alternative to the first or second example functions described with reference to FIG. 3) is to selectively block operations (or attempted operations) within the filesystem 408 in accordance with the prevention policy 107. In this scenario, the policy enforcement agent 117B interfaces with the filesystem filter 410.

A particular scenario is a remote file access (e.g. read or write) request attempted by a user of the first computer device 116A. In a remote access scenario, the second computer device 116B operates in a server role (serving the first computer device 116A, which operates in a client role). The second computer device 116B receives the remote access request at the network interface 308, and passes the remote access request from the network stack 316 to the filesystem 408. The remote access request is associated with an identity of the remote user of the first computer device 116A. In a situation in which the remote access request attempts to perform some remote file access operation that is currently restricted in respect of that user identity, the policy enforcement agent 117B causes the filesystem filter 410 to block the attempted file access operation. Note that the prevention policy 107 can be updated at any time, allowing remote file access operations to be blocked at various stages during an ongoing attack (or suspected attack).

Read/write requests instigated remotely from the first device 116A (the client in this example) are associated with the remote user's identity, allowing them to be filtered locally in the server system (the second computer device 116B in this example), as per the prevention policy 107. The principles described above can be extended to any remote connection or remote access technologies, and are not limited to any particular protocol or operating system. Centralized attack detection and policy generation, coupled with decentralized policy enforcement, targeted to particular user (s) and functionality can be applied across a wide range of remote access technologies, with consequent improvements in the prevention or mitigation of lateral movement attacks.

Figure 5:
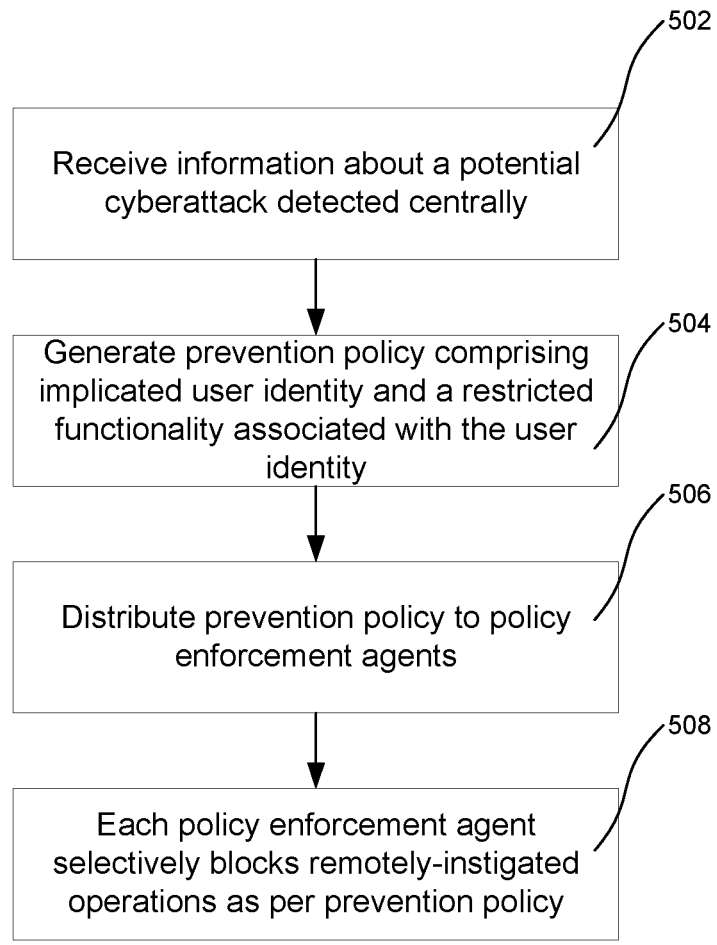
FIG. 5 shows a flowchart for a cyberattack detection and mitigation method.

FIG. 5 shows an illustrative flowchart for a method of cyberattack detection and mitigation.

At step 502, information about a potential cyberattack affecting an organization is received at the policy service 106 of FIG. 1 from the detection service 104.

At step 504, the policy service 106 generates a prevention policy using the information received from the detection service 104, in the manner described herein.

At step 506, the policy service 106 distributed the prevention policy to the computer devices 166 within the affected organization.

At step 508, the policy enforcement agent (e.g. 117A, 117B) on each computer device (e.g. 116A, 116B) implements the prevention policy in respect of remotely-instigated operations detected at that computer device. The prevention policy is enforced by selectively blocking remotely-instigated operations in accordance with the prevention policy which, as noted, can be targeted on specific user(s) and specification function(s) in the manner described herein.

Figure 6:
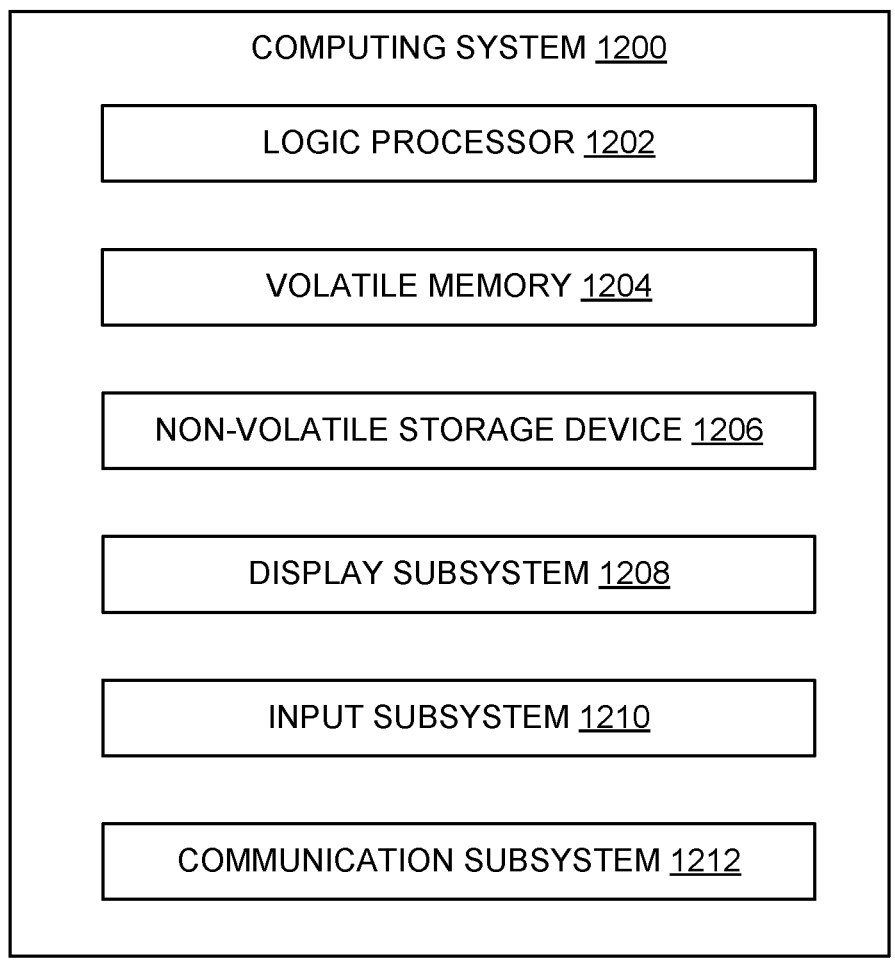
FIG. 6 shows a schematic block diagram of a computer system.

FIG. 6 schematically shows a non-limiting example of a computing system 1200, such as a computing device or system of connected computing devices, that can enact one or more of the methods or processes described above. Computing system 1200 is shown in simplified form. Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 10. Logic processor 1202 comprises one or more physical (hardware) processors configured to carry out processing operations. For example, the logic processor 1202 may be configured to execute instructions that are part of one or more applications, programs, routines, libraries, objects, components, data structures, or other logical constructs. The logic processor 1202 may include one or more hardware processors configured to execute software instructions based on an instruction set architecture, such as a central processing unit (CPU), graphical processing unit (GPU) or other form of accelerator processor. Additionally or alternatively, the logic processor 1202 may include a hardware processor (s)) in the form of a logic circuit or firmware device configured to execute hardware-implemented logic (programmable or non-programmable) or firmware instructions. Processor(s) of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 1202 may be virtualized and executed by remotely accessible, networked computing devices configured in a cloud-computing configuration. In such a case, these virtualized aspects are run on different physical logic processors of various different machines. Non-volatile storage device 1206 includes one or more physical devices configured to hold instructions executable by the logic processor 1202 to implement the methods and processes described herein. When such methods and processes are implemented, the state of non-volatile storage device 1206 may be transformed—e.g., to hold different data. Non-volatile storage device 1206 may include physical devices that are removable and/or built-in. Non-volatile storage device 1206 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 1206 may include nonvolatile, dynamic, static, read/write, read-only, sequential-access, location-addressable, file-addressable, and/or content-addressable devices. Volatile memory 1204 may include one or more physical devices that include random access memory. Volatile memory 1204 is typically utilized by logic processor 1202 to temporarily store information during processing of software instructions. Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices. When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the internet. The term computer readable media as used herein may include computer storage media. Computer storage media may include volatile and non-volatile, removable and nonremovable media (e.g., volatile memory 1204 or non-volatile storage 1206) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 1200 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

Embodiments

According to a first aspect herein, a computer-implemented method comprises: receiving at a policy service from a detection service information about a potential cyberattack detected by the detection service; generating, by the policy service using the information about the potential cyberattack, a prevention policy comprising: a user identity that has remote access rights and is implicated in the potential cyberattack, and a restricted functionality associated with the user identity; and transmitting, from the policy service to a policy enforcement agent executed on a computer device, the prevention policy, which causes the policy enforcement agent to: upon detecting a first remotely-instigated operation associated with the user identity, determine that the first remotely-instigated operation is permitted by the prevention policy, and allow the remotely-instigated operation in response, and upon detecting a second remotely-instigated operation associated with the user identity, match the second remotely-instigated operation to the user identity and the restricted functionality in the prevention policy, and cause the second remotely-instigated operation to be blocked in response. In an embodiment, the generated prevention policy comprises computer instructions for the policy enforcement agent operating on the computer device, which upon execution by a computer processor associated with the computer device, causes the policy enforcement agent to perform operations. In an embodiment, the operations comprise (a) upon detecting a first remotely-instigated operation associated with the user identity, determine that the first remotely-instigated operation is permitted by the prevention policy, and allow the remotely-instigated operation in response. Alternatively or in addition, the operations comprise: upon detecting a second remotely-instigated operation associated with the user identity, match the second remotely-instigated operation to the user identity and the restricted functionality in the prevention policy, and cause the second remotely-instigated operation to be blocked in response According to a second aspect, a computer device comprises: a processor; a network interface coupled to the processor; and a memory coupled to the processor and configured to store computer-readable instructions that are configured, upon execution on the processor, to cause the processor to: receive from a policy service via the network interface a prevention policy comprising: a user identity that has remote access rights and is implicated in a potential cyberattack, and a restricted functionality associated with the user identity; and detect subsequent to receiving the prevention policy a first remotely-instigated operation associated with the user identity; determine that the first remotely-instigated operation is permitted by the prevention policy; allow the remotely-instigated operation in response to determining that the first remotely-instigated operation is permitted; detect subsequent to receiving the prevention policy a second remotely-instigated operation associated with the user identity; match the second remotely-instigated operation to the user identity and the restricted functionality in the prevention policy; and cause the second remotely-instigated operation to be blocked in response to matching the second remotely-instigated operation to the user identity and the restricted functionality in the prevention policy.

According to a third aspect, a computer-readable storage medium is configured to store executable instructions, which, upon execution on a processor of a computer device, cause the processor to: obtain from a policy service remote from the computer device a prevention policy comprising: a user identity that has remote access rights and is implicated in a potential cyberattack, and a restricted functionality associated with the user identity; and detect subsequent to obtaining the prevention policy a first remotely-instigated operation associated with the user identity; determine that the first remotely-instigated operation is permitted by the prevention policy; allow the remotely-instigated operation in response to determining that the first remotely-instigated operation is permitted; detect subsequent to obtaining the prevention policy a second remotely-instigated operation associated with the user identity; match the second remotely-instigated operation to the user identity and the restricted functionality in the prevention policy; and cause the second remotely-instigated operation to be blocked in response to matching the second remotely-instigated operation to the user identity and the restricted functionality in the prevention policy.

In embodiments of any of the above aspects, the restricted functionality may pertain to file access, and the policy enforcement agent may be configured to cause a filesystem of the computer device to block the second remotely-instigated operation.

For example, the restricted functionality may be a server message block functionality (SMB) or network file sharing (NFS) functionality, and the second remotely-instigated operation may be an SMB or NFS operation.

The restricted functionality may pertain to a remote access protocol, and the policy enforcement agent may be configured to cause a filesystem of the computer device to block the second remotely-instigated operation. The second remotely-instigated operation may attempt to establish a remote access session or perform an action within an established remote access session.

For example, the second remotely-instigated operation may be a network logon attempt.

The policy enforcement agent may, for example, cause the second remotely-instigated operation to be blocked by terminating an established remote access session in response to receiving the prevention policy.

The restricted functionality may be a remote procedure call (RPC) or remote desktop protocol (RDP) functionality, and the second remotely-instigated operation may be an RPC or RDP operation.

For example, the second remotely-instigated operation may attempt to establish an RPC interface binding.

The prevention policy may be transmitted from the policy service to a plurality of computer devices.

The prevention policy may be received at the computer device after the user identity has been successfully authenticated by the computer device.

The restricted functionality associated with the user identity may cause the computer device to override a privilege associated with the user identity that would otherwise grant the user identity access to the restricted functionality.

For example, the user identity may be authenticated with a user management service and the user identity is associated with the privilege at the user management service.

The restricted functionality may pertain to file access, and the policy enforcement agent may be configured to cause a filesystem of the computer device to block the second remotely-instigated operation.

The restricted functionality may be a server message block functionality (SMB) or network file sharing (NFS) functionality, and the second remotely-instigated operation may be an SMB or NFS operation.

The restricted functionality may pertain to a remote access protocol, and the policy enforcement agent may be configured to cause a filesystem of the computer device to block the second remotely-instigated operation. The second remotely-instigated operation may attempt to establish a remote access session or perform an action within an established remote access session.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the present disclosure.

The invention claimed is:

1. A computer-implemented method comprising:
receiving, at a policy service from a detection service, information about a potential cyberattack implicating a user identity;
in response to the information about the potential cyberattack, dynamically generating, by the policy service and based on the user identity implicated in the potential cyberattack, a prevention policy comprising an identification of a restricted functionality that is associated with the implicated user identity and dynamically determined based on a level of confidence associated with the implicated user identity, the prevention policy generated using:
the information about the potential cyberattack,
the user identity implicated in the potential cyberattack, and
remote access rights associated with the user identity; and
transmitting, from the policy service to a policy enforcement agent executed on a computer device, the prevention policy, which causes the policy enforcement agent to:
upon detecting a first remotely-instigated operation associated with the user identity, determine that the first remotely-instigated operation is permitted by the prevention policy, and allow the remotely-instigated operation in response, and
upon detecting a second remotely-instigated operation associated with the user identity, determine that the second remotely-instigated operation is restricted by the restricted functionality in the prevention policy, and cause the second remotely-instigated operation to be blocked in response.

2. The method of claim 1, wherein the restricted functionality pertains to file access, and the policy enforcement agent is configured to cause a filesystem of the computer device to block the second remotely-instigated operation.

3. The method of claim 2, wherein the restricted functionality is a server message block functionality (SMB) or network file sharing (NFS) functionality, and the second remotely-instigated operation is an SMB or NFS operation.

4. The method of claim 1, wherein the restricted functionality pertains to a remote access protocol, and the policy enforcement agent is configured to cause a filesystem of the computer device to block the second remotely-instigated operation, wherein the second remotely-instigated operation attempts to establish a remote access session or perform an action within an established remote access session.

5. The method of claim 4, wherein the second remotely-instigated operation is a network logon attempt.

6. The method of claim 4, wherein the policy enforcement agent causes the second remotely-instigated operation to be blocked by terminating an established remote access session in response to receiving the prevention policy.

7. The method of claim 4, wherein the restricted functionality is a remote procedure call (RPC) or remote desktop protocol (RDP) functionality, and the second remotely-instigated operation is an RPC or RDP operation.

8. The method of claim 7, wherein the second remotely-instigated operation attempts to establish an RPC interface binding.

9. The method of claim 1, wherein the prevention policy is transmitted from the policy service to a plurality of computer devices.

10. The method of claim 1, wherein the prevention policy is received at the computer device after the user identity has been successfully authenticated by the computer device.

11. The method of claim 10, wherein the restricted functionality associated with the user identity causes the computer device to override a privilege associated with the user identity that would otherwise grant the user identity access to the restricted functionality.

12. The method of claim 11, wherein the user identity is authenticated with a user management service and the user identity is associated with the privilege at the user management service.

13. A computer device comprising:
a processor;
a network interface coupled to the processor; and
a memory coupled to the processor and configured to store computer-readable instructions that are configured, upon execution on the processor, to cause the processor to:
receive, from a policy service via the network interface, a prevention policy comprising:
a user identity associated with remote access rights and that is implicated in a potential cyberattack, and
an identification of a restricted functionality in the prevention policy, the restricted functionality is associated with the implicated user identity and dynamically determined based on a level of confidence associated with the implicated user identity; and
detect subsequent to receiving the prevention policy a first remotely-instigated operation associated with the user identity;
determine that the first remotely-instigated operation is permitted by the prevention policy;

allow the remotely-instigated operation in response to determining that the first remotely-instigated operation is permitted;

detect subsequent to receiving the prevention policy a second remotely-instigated operation associated with the user identity;

determine that the second remotely-instigated operation is restricted by the restricted functionality in the prevention policy; and cause the second remotely-instigated operation to be blocked in response to matching the second remotely-instigated operation to the user identity and the restricted functionality in the prevention policy.

14. The computer device of claim 13, wherein the restricted functionality pertains to file access, and a policy enforcement agent is configured to cause a filesystem of the computer device to block the second remotely-instigated operation.

15. The computer device of claim 14, wherein the restricted functionality is a server message block functionality (SMB) or network file sharing (NFS) functionality, and the second remotely-instigated operation is an SMB or NFS operation.

16. The computer device of claim 13, wherein the restricted functionality pertains to a remote access protocol, and a policy enforcement agent is configured to cause a filesystem of the computer device to block the second remotely-instigated operation, wherein the second remotely-instigated operation attempts to establish a remote access session or perform an action within an established remote access session.

17. The computer device of claim 16, wherein the second remotely-instigated operation is a network logon attempt.

18. The computer device of claim 16, wherein the policy enforcement agent causes the second remotely-instigated operation to be blocked by terminating an established remote access session in response to receiving the prevention policy.

19. The computer device of claim 16, wherein the restricted functionality is a remote procedure call (RPC) or remote desktop protocol (RDP) functionality, and the second remotely-instigated operation is an RPC or RDP operation.

20. A non-transitory computer-readable storage medium configured to store executable instructions, which, upon execution on a processor of a computer device, cause the processor to:

obtain, from a policy service remote from the computer device, a prevention policy comprising:
  a user identity associated with remote access rights and that is implicated in a potential cyberattack, and
  an identification of a restricted functionality in the prevention policy, the restricted functionality is associated with the implicated user identity and dynamically determined based on a level of confidence associated with the implicated user identity; and detect, subsequent to obtaining the prevention policy, a first remotely-instigated operation associated with the user identity;

determine that the first remotely-instigated operation is permitted by the prevention policy;

allow the remotely-instigated operation in response to determining that the first remotely-instigated operation is permitted;

detect subsequent to obtaining the prevention policy a second remotely-instigated operation associated with the user identity;

determine that the second remotely-instigated operation is restricted by the restricted functionality in the prevention policy; and cause the second remotely-instigated operation to be blocked in response to matching the second remotely-instigated operation to the user identity and the restricted functionality in the prevention policy.

* * * * *